US011254164B2

(12) United States Patent
Sakurada

(10) Patent No.: US 11,254,164 B2
(45) Date of Patent: *Feb. 22, 2022

(54) TIRE COMPRISING A TREAD

(71) Applicant: COMPAGNIE GENERALE DES ETABLISSEMENTS MICHELIN, Clermont-Ferrand (FR)

(72) Inventor: Tomoya Sakurada, Tokyo (JP)

(73) Assignee: COMPAGNIE GENERALE DES ETABLISSEMENTS MICHELIN, Clermont-Ferrand (FR)

(*) Notice: Subject to any disclaimer, the term of this patent is extended or adjusted under 35 U.S.C. 154(b) by 229 days.

This patent is subject to a terminal disclaimer.

(21) Appl. No.: 16/346,202

(22) PCT Filed: Oct. 31, 2017

(86) PCT No.: PCT/JP2017/039234
§ 371 (c)(1),
(2) Date: Apr. 30, 2019

(87) PCT Pub. No.: WO2018/079803
PCT Pub. Date: May 3, 2018

(65) Prior Publication Data
US 2020/0055336 A1   Feb. 20, 2020

(30) Foreign Application Priority Data
Oct. 31, 2016  (WO) ............. PCT/JP2016/082279

(51) Int. Cl.
*C08K 3/013*  (2018.01)
*C08K 3/04*   (2006.01)
*C08K 3/36*   (2006.01)
*B60C 1/00*   (2006.01)
*C08K 5/00*   (2006.01)
*C08K 5/01*   (2006.01)
*C08K 5/52*   (2006.01)
*C08L 7/00*   (2006.01)
*C08L 9/00*   (2006.01)
*C08L 15/00*  (2006.01)

(52) U.S. Cl.
CPC ........... *B60C 1/0016* (2013.01); *C08K 3/013* (2018.01); *C08K 3/04* (2013.01); *C08K 3/36* (2013.01); *C08K 5/0016* (2013.01); *C08K 5/01* (2013.01); *C08K 5/52* (2013.01); *C08L 7/00* (2013.01); *C08L 9/00* (2013.01); *C08L 15/00* (2013.01)

(58) Field of Classification Search
None
See application file for complete search history.

(56) References Cited

U.S. PATENT DOCUMENTS

| 6,013,718 | A | 1/2000 | Cabioch et al. | |
| 6,255,416 | B1* | 7/2001 | Sone | C08F 4/545 526/114 |
| 6,774,255 | B1 | 8/2004 | Tardivat et al. | |
| 6,838,526 | B1* | 1/2005 | Sone | B60C 1/0016 525/332.8 |
| 6,849,754 | B2 | 2/2005 | Deschler et al. | |
| 7,217,751 | B2 | 5/2007 | Durel et al. | |
| 7,300,970 | B2 | 11/2007 | Durel et al. | |
| 7,335,692 | B2* | 2/2008 | Vasseur | B60C 1/0016 524/312 |
| 7,488,768 | B2 | 2/2009 | Tardivat et al. | |
| 7,491,767 | B2 | 2/2009 | Durel et al. | |
| 8,492,475 | B2 | 7/2013 | Araujo Da Silva et al. | |
| 9,175,124 | B2 | 11/2015 | Chaboche et al. | |
| 9,623,705 | B2 | 4/2017 | Tanaka et al. | |
| 2004/0051210 | A1 | 3/2004 | Tardivat et al. | |
| 2004/0129360 | A1 | 7/2004 | Vidal | |
| 2004/0132880 | A1 | 7/2004 | Durel et al. | |
| 2005/0009979 | A1* | 1/2005 | Tanaka | C08C 19/34 524/492 |
| 2005/0016650 | A1 | 1/2005 | Durel et al. | |
| 2005/0016651 | A1 | 1/2005 | Durel et al. | |
| 2005/0154148 | A1* | 7/2005 | Nakamichi | C08L 67/04 525/450 |
| 2008/0188613 | A1* | 8/2008 | Tanaka | C08C 19/25 524/566 |
| 2009/0018272 | A1 | 1/2009 | Hattori et al. | |
| 2009/0186961 | A1 | 7/2009 | Araujo Da Silva et al. | |
| 2009/0209709 | A1 | 8/2009 | Araujo Da Silva et al. | |
| 2009/0234066 | A1 | 9/2009 | Araujo Da Silva et al. | |
| 2009/0292043 | A1* | 11/2009 | Kurazumi | B60C 1/00 523/152 |
| 2009/0306269 | A1* | 12/2009 | Ota | C08L 7/00 524/437 |

(Continued)

FOREIGN PATENT DOCUMENTS

DE   102010000052 A1   7/2011
EP       0778311 B1    6/1997

(Continued)

OTHER PUBLICATIONS

S. Brunauer, et al., "Adsorption of Gases in Multimolecular Layers", J. Am. Chem. Soc., vol. 60, pp. 309-319—(1938).

(Continued)

*Primary Examiner* — Peter A Salamon
(74) *Attorney, Agent, or Firm* — Venable LLP

(57) ABSTRACT

A tire has a tread comprising a rubber composition based on at least an elastomer matrix comprising more than 50 phr and up to 100 phr of a first diene elastomer bearing at least one SiOR function, R being a hydrogen atom or a hydrocarbon radical, and optionally, 0 to less than 50 phr of a second diene elastomer which is different from the first diene elastomer; a reinforcing filler predominately comprising a reinforcing inorganic filler, wherein the content of reinforcing inorganic filler is 20 to 200 phr; and a plasticizing agent comprising 5 to 100 phr of a liquid phosphate plasticizer having a glass transition temperature of less than −80° C.

18 Claims, No Drawings

(56) References Cited

U.S. PATENT DOCUMENTS

| | | | |
|---|---|---|---|
| 2009/0308513 A1* | 12/2009 | Ota | C08K 3/34 |
| | | | 152/209.5 |
| 2010/0105827 A1* | 4/2010 | Tanaka | C08L 15/00 |
| | | | 524/566 |
| 2010/0145089 A1 | 6/2010 | Mignani et al. | |
| 2010/0218868 A1* | 9/2010 | Tonosaki | C08K 3/04 |
| | | | 152/209.18 |
| 2010/0222502 A1* | 9/2010 | Tanaka | C08C 19/44 |
| | | | 524/588 |
| 2011/0146877 A1* | 6/2011 | Tanaka | C08L 15/00 |
| | | | 152/547 |
| 2011/0152458 A1 | 6/2011 | Araujo Da Silva et al. | |
| 2011/0178233 A1 | 7/2011 | Chaboche et al. | |
| 2011/0184114 A1* | 7/2011 | Matsushita | C08L 7/00 |
| | | | 524/495 |
| 2011/0196086 A1* | 8/2011 | Matsushita | C08C 1/04 |
| | | | 524/498 |
| 2011/0294953 A1 | 12/2011 | Seeboth et al. | |
| 2011/0319519 A1* | 12/2011 | Sone | C08L 15/00 |
| | | | 523/155 |
| 2013/0267640 A1* | 10/2013 | Lopez | F24S 25/634 |
| | | | 524/322 |
| 2017/0174001 A1* | 6/2017 | Miyazaki | C08K 3/22 |
| 2017/0313862 A1 | 11/2017 | Yamagishi et al. | |
| 2020/0055336 A1* | 2/2020 | Sakurada | B60C 1/0016 |

FOREIGN PATENT DOCUMENTS

| | | |
|---|---|---|
| EP | 2285852 B1 | 2/2011 |
| FR | 3029932 A1 | 6/2016 |
| JP | 10-273560 A | 10/1998 |
| JP | 2004-168903 A | 6/2004 |
| JP | 2009-40992 A | 2/2009 |
| JP | 2011-94013 A | 5/2011 |
| JP | 2014-122357 A | 7/2014 |
| JP | 2016-84427 A | 5/2016 |
| WO | 96/37547 A2 | 11/1996 |
| WO | 99/09036 A1 | 2/1999 |
| WO | 99/28380 A1 | 6/1999 |
| WO | 02/30939 A1 | 4/2002 |
| WO | 02/31041 A1 | 4/2002 |
| WO | 02/083782 A1 | 10/2002 |
| WO | 03/002648 A1 | 1/2003 |
| WO | 03/002649 A1 | 1/2003 |
| WO | 2004/033548 A1 | 4/2004 |
| WO | 2006/023815 A2 | 3/2006 |
| WO | 2006/125532 A1 | 11/2006 |
| WO | 2006/125533 A1 | 11/2006 |
| WO | 2006/125534 A1 | 11/2006 |
| WO | 2007/098080 A2 | 8/2007 |
| WO | 2008/055986 A2 | 5/2008 |
| WO | 2010/072685 A1 | 7/2010 |
| WO | 2012/069565 A1 | 5/2012 |
| WO | 2016/002506 A1 | 1/2016 |
| WO | 2016/098908 A1 | 6/2016 |
| WO | WO-2016098908 A1 * | 6/2016 ............... C08L 9/00 |

OTHER PUBLICATIONS

Co-Pending U.S. Appl. No. 16/346,218, available on USPTO system.

International Search Report and Written Opinion dated Jan. 19, 2018, in corresponding PCT/JP2017/039234 (10 pages).

International Search Report and Written Opinion dated Dec. 12, 2016, in corresponding PCT/JP2016/082279 (9 pages).

* cited by examiner

TIRE COMPRISING A TREAD

TECHNICAL FIELD

The field of the invention is that of rubber compositions for tires, more precisely rubber compositions for tire treads suitable for snow tires or winter tires capable of rolling over ground surfaces covered with snow.

BACKGROUND ART

As is known, the snow tires classified in a category of use "snow", identified by an inscription the alpine symbol ("3-peak-mountain with snowflake), marked on their sidewalls, mean tires whose tread patterns, tread compounds and/or structures are primarily designed to achieve, in snow conditions, a performance better than that of normal tires intended for normal on-road use with regard to their abilities to initiate, maintain or stop vehicle motion.

CITATION LIST

Patent Literature

[PTL 1]
WO 2012/069565

The patent application (Patent literature 1), discloses a tire tread that comprises a rubber composition based on a functional diene elastomer, a reinforcing inorganic filler and a plasticizing agent, said tire having an improved grip on snow.

Snowy ground has a feature of having a low friction coefficient and a constant objective of tire manufacturers is improvement of a grip performance of tires on snow.

SUMMARY OF INVENTION

Technical Problem

Now, during their research, the inventors have discovered that a specific rubber composition for a tread of a tire makes it possible to unexpectedly improve the grip performance of the tire on snow.

In the present description, unless expressly stated otherwise, all the percentages (%) indicated are percentages by weight (wt %).

The expression "elastomer matrix" is understood to mean, in a given composition, all of the elastomers present in said rubber composition.

The abbreviation "phr" signifies parts by weight per hundred parts by weight of the elastomer matrix in the considered rubber composition.

In the present description, unless expressly indicated otherwise, each $Tg_{DSC}$ (glass transition temperature) is measured in a known way by DSC (Differential Scanning Calorimetry) according to Standard ASTM D3418-08.

Any interval of values denoted by the expression "between a and b" represents the range of values of greater than "a" and of less than "b" (i.e. the limits a and b excluded) whereas any interval of values denoted by the expression "from a to b" means the range of values going from "a" to "b" (i.e. including the strict limits a and b).

The expression "based on" should be understood in the present application to mean a composition comprising the mixture(s) and/or the product of the reaction of the various constituents used, some of the constituents being able or intended to react together, at least partly, during the various manufacturing phases of the composition, in particular during the vulcanization (curing).

Solution to Problem

A first aspect of the invention is a tire having a tread comprising a rubber composition based on at least:
- an elastomer matrix comprising more than 50 phr and up to 100 phr of a first diene elastomer bearing at least one SiOR function, R being a hydrogen atom or a hydrocarbon radical, and optionally, 0 to less than 50 phr of a second diene elastomer which is different from the first diene elastomer;
- a reinforcing filler predominately comprising a reinforcing inorganic filler, that is the reinforcing filler comprising more than 50% by weight of the reinforcing inorganic filler per 100% by weight of the total reinforcing filler, wherein the content of reinforcing inorganic filler is 20 to 200 phr; and
- a plasticizing agent comprising 5 to 100 phr of a liquid phosphate plasticizer having a glass transition temperature ($Tg_{DSC}$) of less than −80° C.

Advantageous Effects of Invention

The rubber composition of the tread of the tire makes it possible to improve the grip performance of the tire on snow.

DESCRIPTION OF EMBODIMENTS

The tires of the invention are particularly intended to equip passenger motor vehicles, including 4×4 (four-wheel drive) vehicles and SUV (Sport Utility Vehicles) vehicles, and industrial vehicles particularly selected from vans and heavy duty vehicles (i.e., bus or heavy road transport vehicles (lorries, tractors, trailers)).

Each of the below aspect(s), the embodiment(s) and the variant(s) including each of the preferred range(s) and/or matter(s) may be applied to any one of the other aspect(s), the other embodiment(s) and the other variant(s) of the invention unless expressly stated otherwise.

Elastomer (or loosely "rubber", the two terms being regarded as synonyms) of the "diene" type is to be understood in a known manner as an (meaning one or more) elastomer derived at least partly (i.e. a homopolymer or a copolymer) from diene monomers (monomers bearing two carbon-carbon double bonds, conjugated or not).

These diene elastomers can be classified into two categories: "essentially unsaturated" or "essentially saturated". Generally, the expression "essentially unsaturated" is understood to mean a diene elastomer resulting at least in part from conjugated diene monomers having a content of units of diene origin (conjugated dienes) which is greater than 15% (mol %); thus it is that diene elastomers such as butyl rubbers or diene/α-olefin copolymers of the EPDM type do not fall under the preceding definition and may especially be described as "essentially saturated" diene elastomers (low or very low content of units of diene origin, always less than 15%). In the category of "essentially unsaturated" diene elastomers, the expression "highly unsaturated" diene elastomer is understood to mean in particular a diene elastomer having a content of units of diene origin (conjugated dienes) which is greater than 50%.

Although it applies to any type of diene elastomer, a person skilled in the art of tires will understand that the invention is preferably employed with essentially unsaturated diene elastomers.

Given these definitions, the expression diene elastomer capable of being used in the compositions in accordance with the invention is understood in particular to mean:

(a)—any homopolymer obtained by polymerization of a conjugated diene monomer, preferably having from 4 to 12 carbon atoms;

(b)—any copolymer obtained by copolymerization of one or more conjugated dienes with one another or with one or more vinyl aromatic compounds preferably having from 8 to 20 carbon atoms.

The following are suitable in particular as conjugated dienes: 1,3-butadiene, 2-methyl-1,3-butadiene, 2,3-di($C_1$-$C_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, an aryl-1,3-butadiene, 1,3-pentadiene or 2,4-hexadiene. The following, for example, are suitable as vinylaromatic compounds: styrene, ortho-, meta- or para-methylstyrene, the "vinyltoluene" commercial mixture, para-(tert-butyl) styrene, methoxystyrenes, chlorostyrenes, vinylmesitylene, divinylbenzene or vinylnaphthalene.

The first diene elastomer may be selected from the group consisting of polybutadienes (BRs), synthetic polyisoprenes (IRs), natural rubber (NR), butadiene copolymers, isoprene copolymers and the mixtures thereof; such copolymers are selected more preferably from the group consisting of butadiene-styrene copolymers (SBRs) and the mixtures thereof.

The first diene elastomer may have any microstructure which depends on the polymerization conditions used, in particular on the presence or absence of a modifying and/or randomizing agent and on the amounts of modifying and/or randomizing agent employed. This elastomer may, for example, be a block, statistical, sequential or micro sequential elastomer and may be prepared in dispersion or in solution.

The first diene elastomer bears at least one SiOR function, R being a hydrogen atom or a hydrocarbon radical.

The expression "hydrocarbon radical" means a monovalent group essentially consisting of carbon and hydrogen atoms. Such a group may comprise at least one heteroatom, and it is known that the assembly formed by the carbon and hydrogen atoms represents the major number fraction in the hydrocarbon radical, for example alkyl or alkoxyalkyl; preferably assembly formed by the carbon and hydrogen atoms represents the entirety of the hydrocarbon radical(s), for example alkyl. Such a SiOR (R is alkyl or alkoxyalkyl) is referred as an "alkoxysilane" function. While, a SiOH (R is a hydrogen atom) is referred as a "silanol" function.

Generally, a function borne by an elastomer, particularly a diene elastomer, may be located on the elastomer chain end(s) or may not be located at the elastomer chain ends, that is, may be away from the chain ends. The first case occurs for example when the diene elastomer is prepared using a polymerization initiator bearing the function or using a functionalizing agent. The second case occurs for example when the diene elastomer is modified by the use of a coupling agent or star-branching agent bearing the function.

A second aspect of the invention is the tire according to the first aspect, wherein the first diene elastomer is a styrene-butadiene copolymer (SBR), preferably a solution styrene-butadiene copolymer which is a copolymer of butadiene and styrene, prepared in solution.

A third aspect of the invention is the tire according to the first or the second aspect, wherein the SiOR function is located at the chain end of the first diene elastomer.

According to a preferred embodiment of the third aspect, the first diene elastomer bearing the SiOR function located at the chain end may be prepared according to the procedure described in a patent EP 0 778 311 B1, for example by reaction of the carbanion at the end of the living elastomeric chain with hexamethylcyclotrisiloxane followed by reaction with a proton donor.

A fourth aspect of the invention is the tire according to the first or the second aspect, wherein the SiOR function is not located at the chain ends of the first diene elastomer.

According to a first variant of the fourth aspect, the SiOR function borne by the first diene elastomer may be a pendant group, which is equivalent to saying that the silicon atom of the SiOR function may not be inserted between the carbon-carbon bonds of the elastomer chain of the first diene elastomer. A diene elastomer bearing a pendant SiOR function may for example be prepared by hydrosilylation of the elastomer chain by a silane bearing an alkoxysilane group, followed by hydrolysis of the alkoxysilane function to give a SiOR function.

According to a second variant of the fourth aspect, the SiOR function borne by the first diene elastomer may not be a pendant group, but may be situated in the elastomer chain, that is, may be within the elastomer chain, which is equivalent to saying that the silicon atom of the SiOR function may be inserted between the carbon-carbon bonds of the elastomer chain of the first diene elastomer. Such a diene elastomer may be prepared according to the procedure described in a patent EP 2 285 852 B1. This second variant is preferential and applies to the fourth aspect.

A fifth aspect of the invention is the tire according to any one of the first to the fourth aspects, wherein the first diene elastomer further bears at least one amine function, preferably at least one tertiary amine function.

According to a preferred embodiment of the fifth aspect, the amine function borne by the first diene elastomer may be a tertiary amine function. Mention will be made, as tertiary amine function, of the amines substituted with $C_1$-$C_{10}$ alkyl radicals, preferably $C_1$-$C_4$ alkyl, more preferably methyl or ethyl radical(s).

According to this embodiment or a preferred embodiment of the fifth aspect, the amine function borne by the first diene elastomer may be a pendant group. The pendant position of the amine function means, in a known way, that the nitrogen atom of the amine function may not be inserted between the carbon-carbon bonds of the elastomer chain of the first diene elastomer.

A sixth aspect of the invention is the tire according to the fifth aspects, wherein the SiOR function bears the amine function.

Such a diene elastomer may result from the modification of a diene elastomer by a coupling agent that introduces, the elastomer chain, an alkoxysilane group bearing an amine function according to the operating procedure described in a patent EP 2 285 852 B1. The following are suitable for example as coupling agent: N,N-dialkylaminopropyltrialkoxysilanes, $C_1$-$C_{10}$, preferably $C_1$-$C_4$, dialkyl groups, the compounds 3-(N,N-dimethylaminopropyl)trimethoxysilane, 3-(N,N-dimethylaminopropyl)triethoxysilane, 3-(N,N-di ethyl aminopropyl)trimethoxysilane, 3-(N,N-di ethyl aminopropyl)triethoxysilane being most particularly preferred, irrespective of the embodiment of the invention.

A seventh aspect of the invention is the tire according to any one of the first to the sixth aspects, wherein R of the SiOR function is a hydrogen atom.

An eighth aspect of the invention is the tire according to any one of the first to the sixth aspects, wherein R of the SiOR function is a hydrocarbon radical.

According to a preferred embodiment of the eighth aspect, the hydrocarbon radical may be an alkyl radical, preferably an alkyl radical having 1 to 12 carbon atoms, more preferably a branched, linear or else cyclic alkyl radical having 1 to 12 carbon atoms, still more preferably 1 to 6 carbon atoms, particularly 1 to 4 carbon atoms, more particularly methyl or ethyl radical(s).

A ninth aspect of the invention is the tire according to any one of the first to the eighth aspects, wherein the first diene elastomer has a glass transition temperature ($Tg_{DSC}$) of lower than −40° C., (notably between −100° C. and −40° C.), advantageously less than −45° C. (notably between −90° C. and −45° C.).

A tenth aspect of the invention is the tire according to any one of the first to the ninth aspects, wherein the elastomer matrix comprises 60 to 100 phr, preferably 70 to 100 phr, more preferably 80 to 100 phr, still more preferably 90 to 100 phr, particularly 100 phr, of the first diene elastomer and optionally, 0 to 40 phr, preferably 0 to 30 phr, more preferably 0 to 20 phr, still more preferably 0 to 10 phr, of the second diene elastomer.

An eleventh aspect of the invention is the tire according to any one of the first to the tenth aspects, wherein the second diene elastomer is selected from the group consisting of polybutadienes, natural rubber, synthetic polyisoprenes, butadiene copolymers, isoprene copolymers and the mixtures thereof.

The rubber composition of the tread of the tire according to the invention is based on a reinforcing filler.

The reinforcing filler may comprise a reinforcing inorganic filler (for instance, silica), carbon black or the mixtures thereof.

The reinforcing filler in the rubber composition of the tread of the tire according to the invention predominately comprises a reinforcing inorganic filler, that means the reinforcing filler comprises more than 50% by weight of the reinforcing inorganic filler per 100% by weight of the total reinforcing filler, and the content of reinforcing inorganic filler is 20 to 200 phr. Preferably, the content of reinforcing inorganic filler is more than 60% by weight, more preferably more than 70% by weight, still more preferably more than 80% by weight, particularly more than 90% by weight, per 100% by weight of the total reinforcing filler.

A twelfth aspect of the invention is the tire according to any one of the first to the eleventh aspects, wherein the reinforcing filler comprises 30 to 190 phr, preferably 40 to 180 phr, more preferably 50 to 170 phr, still more preferably 60 to 160 phr, particularly 70 to 150 phr, of the reinforcing inorganic filler.

The expression "reinforcing inorganic filler" should be understood here to mean any inorganic or mineral filler, whatever its color and its origin (natural or synthetic), also referred to as "white filler", "clear filler" or even "non-black filler", in contrast to carbon black, capable of reinforcing by itself alone, without means other than an intermediate coupling agent, a rubber composition intended for the manufacture of tires, in other words capable of replacing, in its reinforcing role, a conventional tire-grade carbon black; such a filler is generally characterized, in a known manner, by the presence of hydroxyl (—OH) groups at its surface.

The physical state under the presence of this filler is unimportant, whether it is in the form of powder, microbeads, granules, beads or any other suitable densified form. Of course, the reinforcing inorganic filler of the mixtures of various reinforcing inorganic fillers, preferably of highly dispersible siliceous and/or aluminous fillers is described hereafter.

Mineral fillers of the siliceous type, preferably silica ($SiO_2$) and/or the aluminous type, preferably alumina ($Al_2O_3$) are suitable in particular as the reinforcing inorganic fillers.

A thirteenth aspect of the invention is the tire according to any one of the first to the twelfth aspects, wherein the reinforcing inorganic filler is silica. The reinforcing inorganic filler may comprise a type of silica or a blend of several silicas. The silica used may be any reinforcing silica known to a person skilled in the art, in particular any precipitated or pyrogenic silica having a BET surface area and a CTAB specific surface area that are both less than 450 $m^2/g$, preferably from 20 to 400 $m^2/g$. Such silica may be covered or not. Mention will be made, as low specific surface silica, of Sidistar R300 from Elkem Silicon Materials. Mention will be made, as highly dispersible precipitated silicas ("HDSs"), for example, of "Ultrasil 7000" and "Ultrasil 7005" from Evonik, "Zeosil 1165 MP", "Zeosil 1135 MP" and "Zeosil 1115 MP" from Rhodia, "Hi-Sil EZ150G" from PPG, "Zeopol 8715", "Zeopol 8745" and "Zeopol 8755" from Huber or the silicas with a high specific surface area as described in a patent application WO 03/016387. Mention will be made, as pyrogenic silicas, for example, of "CAB-O-SIL S-17D" from Cabot, "HDK T40" from Wacker, "Aeroperl 300/30", "Aerosil 380", "Aerosil 150" or "Aerosil 90" from Evonik. Such silica may be covered, for example, "CAB-O-SIL TS-530" covered with hexamethyldiasilazene or "CAB-O-SIL TS-622" covered with dimethyldichlorosilane from Cabot.

The reinforcing inorganic filler used, particularly in case of that it is silica, has a BET surface area and a CTAB specific surface area that are advantageously 50 to 350 $m^2/g$, more advantageously 100 to 300 $m^2/g$, still more preferably between 150 and 250 $m^2/g$.

The BET surface area is measured according to a known method, that is, by gas adsorption using the Brunauer-Emmett-Teller method described in "The Journal of the American Chemical Society", Vol. 60, page 309, February 1938, and more specifically, in accordance with the French standard NF ISO 9277 of December 1996 (multipoint volumetric method (5 points); where gas: nitrogen, degassing: 1 hour at 160° C., relative pressure range p/po: 0.05 to 0.17). The CTAB specific surface area is determined according to the French standard NF T 45-007 of November 1987 (method B).

A person skilled in the art will understand that a reinforcing filler of another nature, in particular organic nature, such as carbon black, might be used as filler equivalent to the reinforcing inorganic filler described in the present section, provided that this reinforcing filler is covered with an inorganic layer, such as silica, or else comprises, at its surface, functional sites, in particular hydroxyls, requiring the use of a coupling agent in order to form the connection between the filler and the elastomer. By way of example, mention may be made of carbon blacks for tires, such as described in patent applications WO 96/37547 and WO 99/28380.

An fourteenth aspect of the invention is the tire according to any one of the first to the thirteenth aspects, wherein the reinforcing filler further comprises less than 40 phr (for example, between 0.5 and 40 phr), preferably less than 30 phr (for example, between 1 and 30 phr), more preferably less than 20 phr (for example, between 1.5 and 20 phr), still more preferably less than 10 phr (for example, between 2 and 10 phr), of carbon black.

Within the ranges indicated, there is a benefit of coloring properties (black pigmentation agent) and anti-UV properties of carbon blacks, without furthermore adversely affecting the typical performance provided by the reinforcing inorganic filler, namely low hysteresis (reduced rolling resistance) and high grip on wet, snow-covered or icy ground.

In order to couple the reinforcing inorganic filler to the elastomer matrix, for instance, the diene elastomer, use can be made, in a known manner, of a coupling agent (or bonding agent) intended to provide a satisfactory connection, of chemical and/or physical nature, between the reinforcing inorganic filler (surface of its particles) and the elastomer matrix, for instance, the diene elastomer. This coupling agent is at least bifunctional. Use can be made in particular of at least bifunctional organosilanes or polyorganosiloxanes.

Use can be made in particular of silane polysulphides, referred to as "symmetrical" or "asymmetrical" depending on their particular structure, as described, for example, in applications WO 03/002648, WO 03/002649 and WO 2004/033548.

Particularly suitable silane polysulphides correspond to the following general formula (I):

Z-A-Sx-A-Z, in which: (I)

x is an integer from 2 to 8 (preferably from 2 to 5);
A is a divalent hydrocarbon radical (preferably, $C_1$-$C_8$ alkylene groups or $C_6$-$C_{12}$ arylene groups, more particularly $C_1$-$C_{10}$, in particular $C_1$-$C_4$, alkylenes, especially propylene);
Z corresponds to one of the formulae below:

[Chem. 1]

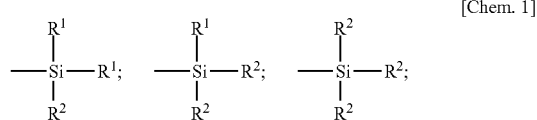

in which:
the $R^1$ radicals which are unsubstituted or substituted and identical to or different from one another, represent a $C_1$-$C_{18}$ alkyl, $C_5$-$C_{18}$ cycloalkyl or $C_6$-$C_{18}$ aryl group (preferably, $C_1$-$C_6$ alkyl, cyclohexyl or phenyl groups, in particular $C_1$-$C_4$ alkyl groups, more particularly methyl and/or ethyl),
the $R^2$ radicals which are unsubstituted or substituted and identical to or different from one another, represent a $C_1$-$C_{18}$ alkoxyl or $C_5$-$C_{18}$ cycloalkoxyl group (preferably a group selected from $C_1$-$C_8$ alkoxyls and $C_5$-$C_8$ cycloalkoxyls, more preferably a group selected from $C_1$-$C_4$ alkoxyls, in particular methoxyl and ethoxyl), are suitable in particular, without limitation of the above definition.

In the case of a mixture of alkoxysilane polysulphides corresponding to the above formula (I), in particular normal commercially available mixtures, the mean value of the "x" indices is a fractional number preferably of between 2 and 5, more preferably of approximately 4. However, the present invention can also advantageously be carried out, for example, with alkoxysilane disulphides (x=2).

Mention will more particularly be made, as examples of silane polysulphides, of bis(($C_1$-$C_4$)alkoxyl($C_1$-$C_4$)alkylsilyl($C_1$-$C_4$)alkyl)polysulphides (in particular disulphides, trisulphides or tetrasulphides), such as, for example, bis(3-trimethoxysilylpropyl) or bis(3-triethoxysilylpropyl)polysulphides. Use is in particular made, among these compounds, of bis(3-triethoxysilylpropyl)tetrasulphide, abbreviated to TESPT, of formula $[(C_2H_5O)_3Si(CH_2)_3S]_2$, or bis(3-triethoxysilylpropyl)disulphide, abbreviated to TESPD, of formula $[(C_2H_5O)_3Si(CH_2)_3S]_2$. Mention will also be made, as preferred examples, of bis(mono($C_1$-$C_4$)alkoxyldi($C_1$-$C_4$)alkylsilylpropyl)polysulphides (in particular disulphides, trisulphides or tetrasulphides), more particularly bis(monoethoxydimethylsilylpropyl)tetrasulphide, as described in patent application WO 02/083782 (or U.S. Pat. No. 7,217,751).

Mention will in particular be made, as coupling agent other than alkoxysilane polysulphide, of bifunctional POSs (polyorganosiloxanes) or of hydroxysilane polysulphides ($R^2$=OH in the above formula (I)), such as described in patent applications WO 02/30939 (or U.S. Pat. No. 6,774,255) and WO 02/31041 (or US 2004/051210), or of silanes or POSs carrying azodicarbonyl functional groups, such as described, for example, in patent applications WO 2006/125532, WO 2006/125533 and WO 2006/125534.

As examples of other silane sulphides, mention will be made, for example, of the silanes bearing at least one thiol (—SH) function (referred to as mercaptosilanes) and/or at least one blocked thiol function, such as described, for example, in patents or patent applications U.S. Pat. No. 6,849,754, WO 99/09036, WO 2006/023815, WO 2007/098080, WO 2008/055986 and WO 2010/072685.

Of course, use could also be made of mixtures of the coupling agents described previously, as described in particular in the aforementioned patent application WO 2006/125534.

According to one preferred embodiment of the invention, the content of coupling agent may be from 0.5 to 15 wt % relative to the amount of the reinforcing inorganic filler, particularly silica.

According to one preferred embodiment of the invention, the rubber composition of the tread of the tire according to the invention may be based on less than 30 phr (for example, between 0.1 and 30 phr), preferably less than 25 phr (for example, between 0.5 and 25 phr), more preferably less than 20 phr (for example, between 1 and 20 phr), still more preferably less than 15 phr (for example, between 1.5 and 15 phr) of coupling agent.

The rubber composition of the tread of the tire according to the invention is based on a plasticizing agent.

The plasticizing agent may comprise a liquid plasticizer(s), a hydrocarbon resin(s), or the mixtures thereof.

The plasticizing agent in the rubber composition of the tread of the tire according to the invention comprises 5 to 100 phr of a liquid phosphate plasticizer having a glass transition temperature ($Tg_{DSC}$) of less than −80° C. (for example, between −130° C. and −80° C.). The liquid phosphate plasticizer is liquid at 20° C. (under atmospheric pressure) by definition. The role of the liquid phosphate plasticizer is to soften the matrix by diluting the elastomer and the reinforcing filler, especially on the tire running at air temperature of at most 0° C.

Regarding the content of the liquid phosphate plasticizer, below the indicated minimum, the targeted technical effect is insufficient. Wherein the indicated maximum, there is an issue of cost of the liquid phosphate plasticizer and a risk of worsening processability.

A fifteenth aspect of the invention is the tire according to any one of the first to the fourteenth aspects, wherein the plasticizing agent comprises 10 to 90 phr, preferably 15 to 80 phr, more preferably 20 to 70 phr, still more preferably 30 to 60 phr, of the liquid phosphate plasticizer.

A sixteenth aspect of the invention is the tire according to any one of the first to the fifteenth aspects, wherein the liquid phosphate plasticizer has the glass transition temperature ($Tg_{DSC}$) of less than −90° C. (for example, between −120° C. and −90° C.), preferably less than −100° C. (for example, between −110° C. and −90° C.).

A seventeenth aspect of the invention is the tire according to any one of the first to the sixteenth aspects, wherein the liquid phosphate plasticizer has between 12 and 30 carbon atoms in total, preferably the liquid phosphate plasticizer is trialkyl phosphate having between 12 and 30 carbon atoms in total.

The number of carbon atoms of trialkyl phosphate should be taken to mean the total number of carbon atoms of three alkyl groups. The three alkyl groups of trialkyl phosphate may be the same or different each other. The term "alkyl" used herein refers to a straight or branched alkyl group, which may contain a hetero atom such as an oxygen atom in its chain, or which may be substituted with a halogen atom such as fluorine, chlorine, bromine or iodine. The trialkyl phosphate may have one or two phenyl groups of instead of alkyl groups.

Mention may be made, as examples of the trialkyl phosphate, of an oil selected from the group consisting of tris(2-butoxyethyl) phosphate ($C_{18}H_{39}O_7P$), 2-ethylhexyl diphenyl phosphate ($C_{20}H_{27}O_4P$), trioctyl phosphate (especially, tris(2-ethylhexyl) phosphate) ($C_{24}H_{51}O_4P$) and the mixtures thereof.

An eighteenth aspect of the invention is the tire according to any one of the first to the seventeenth aspects, wherein the liquid phosphate plasticizer is tris(2-ethylhexyl) phosphate.

The liquid phosphate plasticizer is commercially available; for example, product name: Disflmoll TOF ($Tg_{DSC}$=−105° C.) provided by Lanxess co., ltd.

A nineteenth aspect of the invention is the tire according to any one of the first to the eighteenth aspects, wherein the plasticizing agent further comprises 0 to 50 phr, preferably 0 to 40 phr, more preferably 0 to 30 phr, still more preferably 0 to 20 phr, particularly 0 to 10 phr, more particularly 0 to 5 phr, still more particularly 0 to 2 phr, advantageously 0 to 1 phr, more advantageously 0 to 0.5 phr, still more advantageously 0 to 0.2 phr, of liquid plasticizer(s) other than the liquid phosphate plasticizer.

Any extending oil, whether of aromatic or non-aromatic nature, any liquid plasticizing agent known for its plasticizing properties with regard to elastomer matrix(es), for instance, diene elastomers, can be used as the liquid plasticizer(s) other than the liquid phosphate plasticizer. At ambient temperature (20° C.) under atmospheric pressure, these plasticizers or these oils, which are more or less viscous, are liquids (that is to say, as a reminder, substances that have the ability to eventually take on the shape of their container), as opposite to plasticizing hydrocarbon resin(s) which are by nature solid at ambient temperature (20° C.) under atmospheric pressure.

A twentieth aspect of the invention is the tire according to the nineteenth aspect, wherein the liquid plasticizer(s) other than the liquid phosphate plasticizer are selected from the group consisting of liquid diene polymers, polyolefinic oils, naphthenic oils, paraffinic oils, Distillate Aromatic Extracts (DAE) oils, Medium Extracted Solvates (MES) oils, Treated Distillate Aromatic Extracts (TDAE) oils, Residual Aromatic Extracts (RAE) oils, Treated Residual Aromatic Extracts (TRAE) oils, Safety Residual Aromatic Extracts (SRAE) oils, mineral oils, vegetable oils, ether plasticizers, ester plasticizers other than phosphate plasticizers, sulphonate plasticizers and the mixtures thereof, preferably selected from the group consisting of MES oils, TDAE oils, naphthenic oils, vegetable oils and the mixtures thereof, more preferably selected from the group consisting of MES oils, vegetable oils and the mixtures thereof, still more preferably selected from the group consisting of vegetable oils and the mixtures thereof. The vegetable oil(s) may be made of an oil selected from the group consisting of linseed, safflower, soybean, corn, cottonseed, turnip seed, castor, tung, pine, sunflower, palm, olive, coconut, groundnut and grapeseed oils, and the mixtures thereof, particularly sunflower oil(s), more particularly sunflower oil(s) containing over 60%, still more particularly over 70%, advantageously over 80%, more advantageously over 90%, still advantageously 100%, by weight of oleic acid.

A twenty first aspect of the invention is the tire according to any one of the first to the twentieth aspects, wherein the plasticizing agent further comprises 0 to 50 phr, preferably 0 to 40 phr, more preferably 0 to 30 phr, still more preferably 10 to 30 phr, of hydrocarbon resin(s) having the glass transition temperature ($Tg_{DSC}$) above 20° C., preferably above 30° C., more preferably above 40° C.

According to a preferred embodiment of the invention, the total content of the liquid plasticizer(s) other than the liquid phosphate plasticizer, the liquid phosphate plasticizer and the hydrocarbon resin(s) is more than 50 phr, preferably more than or equal to 60 phr.

The hydrocarbon resin(s) are polymer well known by a person skilled in the art, which are essentially based on carbon and hydrogen, and thus miscible by nature in rubber composition(s), for instance, diene elastomer composition(s). They can be aliphatic or aromatic or also of the aliphatic/aromatic type, that is to say based on aliphatic and/or aromatic monomers. They can be natural or synthetic and may or may not be petroleum-based (if such is the case, also known under the name of petroleum resins). They are preferably exclusively hydrocarbon, that is to say, that they comprise only carbon and hydrogen atoms.

Preferably, the hydrocarbon resins as being "plasticizing" exhibit at least one, more preferably all, of the following characteristics:
  a $Tg_{DSC}$ of above 20° C. (for example between 20° C. and 100° C.), preferably above 30° C. (for example between 30° C. and 100° C.), more preferably above 40° C. (for example between 40° C. and 100° C.);
  a number-average molecular weight (Mn) of between 400 and 2000 g/mol (more preferably between 500 and 1500 g/mol);
  a polydispersity index (PI) of less than 3, more preferably less than 2 (reminder: PI=Mw/Mn with Mw the weight-average molecular weight).

The macrostructure (Mw, Mn and PI) of the hydrocarbon resins is determined by steric exclusion chromatography (SEC): solvent tetrahydrofuran; temperature 35° C.; concentration 1 g/l; flow rate 1 ml/min; solution filtered through a filter with a porosity of 0.45 µm before injection; Moore calibration with polystyrene standards; set of 3 "Waters" columns in series ("Styragel" HR4E, HR1 and HR0.5); detection by differential refractometer ("Waters 2410") and its associated operating software ("Waters Empower").

A twenty second aspect of the invention is the tire according to the twenty first aspect, wherein the hydrocarbon resin(s) as being "plasticizing" are selected from the group consisting of cyclopentadiene (abbreviated to CPD) homopolymer or copolymer resins, dicyclopentadiene (abbreviated to DCPD) homopolymer or copolymer resins, terpene homopolymer or copolymer resins, $C_5$ fraction homopolymer or copolymer resins, $C_9$ fraction homopolymer or copolymer resins, alpha-methyl styrene homopolymer or copolymer resins and the mixtures thereof. Use is more preferably made, among the above copolymer resins, of those selected from the group consisting of (D)CPD/ vinylaromatic copolymer resins, (D)CPD/terpene copolymer resins, (D)CPD/$C_5$ fraction copolymer resins, (D)CPD/ $C_9$ fraction copolymer resins, terpene/vinylaromatic copolymer resins, terpene/phenol copolymer resins, $C_5$ fraction/vinyl-aromatic copolymer resins, $C_9$ fraction/vinylaromatic copolymer resins, and the mixtures thereof.

The term "terpene" combines here, in a known way, the α-pinene, β-pinene and limonene monomers; use is preferably made of a limonene monomer, which compound exists, in a known way, in the form of three possible isomers: L-limonene (laevorotatory enantiomer), D-limonene (dextrorotatory enantiomer) or else dipentene, the racemate of the dextrorotatory and laevorotatory enantiomers. Styrene, α-methylstyrene, ortho-, meta- or para-methylstyrene, vinyltoluene, para-(tert-butyl)styrene, methoxystyrenes, chlorostyrenes, hydroxystyrenes vinylmesitylene, divinylbenzene, vinylnaphthalene, or any vinylaromatic monomer resulting from a $C_9$ fraction (or more generally from a $C_8$ to $C_{10}$ fraction) are suitable, for example, as vinylaromatic monomer. Preferably, the vinylaromatic compound is styrene or a vinylaromatic monomer resulting from a $C_9$ fraction (or more generally from a $C_8$ to $C_{10}$ fraction). Preferably, the vinylaromatic compound is the minor monomer, expressed as molar fraction, in the copolymer under consideration.

The preferred resins above are well known to a person skilled in the art and are commercially available, for example:
  polylimonene resins: by DRT under the name "Dercolyte L120" (Mn=625 g/mol; Mw=1010 g/mol; PI=1.6; $Tg_{DSC}$=72° C.) or by Arizona Chemical Company under the name "Sylvagum TR7125C" (Mn=630 g/mol; Mw=950 g/mol; PI=1.5; $Tg_{DSC}$=70° C.);
  $C_5$ fraction/vinylaromatic, notably $C_5$ fraction/styrene or $C_5$ fraction/$C_9$ fraction, copolymer resins: by Neville Chemical Company under the names "Super Nevtac 78", "Super Nevtac 85" or "Super Nevtac 99", by Goodyear Chemicals under the name "Wingtack Extra", by Kolon under the names "Hikorez T1095" and "Hikorez T1100", or by Exxon under the names "Escorez 2101" and "ECR 373";
  limonene/styrene copolymer resins: by DRT under the name "Dercolyte TS 105" or by Arizona Chemical Company under the names "ZT115LT" and "ZT5100".

Mention may also be made, as examples of other preferred resins, of phenol-modified α-methylstirene resins. It should be remembered that, in order to characterize these phenol-modified resins, use is made, in a known way, of a number referred to as "hydroxyl number" (measured according to Standard ISO 4326 and expressed in mg KOH/g). α-Methylstirene resins, in particular those modified with phenol, are well known to a person skilled in the art and are available commercially, for example sold by Arizona Chemical Company under the names "Sylvares SA 100" (Mn=660 g/mol; PI=1.5; $Tg_{DSC}$=53° C.); "Sylvares SA 120" (Mn=1030 g/mol; PI=1.9; $Tg_{DSC}$=64° C.); "Sylvares 540" (Mn=620 g/mol; PI=1.3; $Tg_{DSC}$=36° C.; hydroxyl number=56 mg KOH/g); and "Sylvares 600" (Mn=850 g/mol; PI=1.4; $Tg_{DSC}$=50° C.; hydroxyl number=31 mg KOH/g).

The rubber compositions of the treads of the tires according to the invention may be based on all or a portion(s) of the usual additives generally used in the elastomer compositions intended for the manufacture of treads for tires, in particular for snow tires or winter tires, such as, for example, protection agents, such as antiozone waxes, chemical antiozonants, antioxidants, reinforcing resins, methylene acceptors (for example phenolic novolak resin) or methylene donors (for example HMT or H3M), a crosslinking system based either on sulphur or on donors of sulphur and/or per oxide and/or bismaleimides, vulcanization accelerators, or vulcanization activators.

These compositions can be also based on coupling activators when a coupling agent is used, agents for covering the reinforcing inorganic filler or more generally processing aids capable, in a known way, by virtue of an improvement in the dispersion of the filler in the rubber matrix and of a lowering of the viscosity of the compositions, of improving their property of processing in the raw state; these agents are, for example, hydrolysable silanes, such as alkylalkoxysilanes, polyols, polyethers, amines, or hydroxylated or hydrolysable polyorganosiloxanes.

The rubber compositions of the treads of the tires according to the invention may be manufactured in appropriate mixers using two successive preparation phases well known to a person skilled in the art: a first phase of thermomechanical working or kneading (referred to a as "non-productive" phase) at high temperature, up to a maximum temperature of between 110° C. and 190° C., preferably between 130° C. and 180° C., followed by a second phase of mechanical working (referred to as "productive" phase) at a lower temperature, typically of less than 110° C., for example between 40° C. and 100° C., finishing phase during which the crosslinking or vulcanization system is incorporated.

A process which can be used for the manufacture of such compositions comprises, for example and preferably, the following steps:
  incorporating in the elastomer matrix, for instance, the diene elastomer(s), in a mixer, the reinforcing filler, the plasticizing agent, during a first stage ("non productive" stage) everything being kneaded thermomechanically (for example in one or more steps) until a maximum temperature of between 110° C. and 190° C. is reached;
  cooling the combined mixture to a temperature of less than 100° C.;
  subsequently incorporating, during a second stage (referred to as a "productive" stage), a crosslinking system;
  kneading everything up to a maximum temperature of less than 110° C.;
  extruding or calendering the rubber composition thus obtained, in particular in the form of a tire tread.

By way of example, the first (non-productive) phase is carried out in a single thermomechanical stage during which all the necessary constituents are introduced into an appropriate mixer, such as a standard internal mixer, followed, in a second step, for example after kneading for 1 to 2 minutes, by the other additives, optional additional filler-covering agents or processing aids, with the exception of the cross-linking system. The total kneading time, in this non-productive phase, is preferably between 1 and 15 min.

After cooling the mixture thus obtained, the crosslinking system is then incorporated at low temperature (for example, between 40° C. and 100° C.), generally in an external mixer, such as an open mill; the combined mixture is then mixed (the second (productive) phase) for a few minutes, for example between 2 and 15 min.

The crosslinking system is preferably based on sulphur and on a primary vulcanization accelerator, in particular on an accelerator of sulphenamide type. Added to this vulcanization system are various known secondary accelerators or vulcanization activators, such as zinc oxide, stearic acid, guanidine derivatives (in particular diphenylguanidine), and the like, incorporated during the first non-productive phase and/or during the productive phase. The content of sulphur is preferably between 0.5 and 10.0 phr, more preferably between 0.5 and 3.0 phr, and that of the primary accelerator is preferably between 0.5 and 5.00 phr.

Use may be made, as accelerator (primary or secondary) of any compound capable of acting as accelerator of the vulcanization of elastomer matrix, for instance, diene elastomers, in the presence of sulphur, in particular accelerators of the thiazoles type and their derivatives, accelerators of thiurams types, or zinc dithiocarbamates. These accelerators are more preferably selected from the group consisting of 2-mercaptobenzothiazyl disulphide (abbreviated to "MBTS"), N-cyclohexyl-2-benzothiazole sulphenamide (abbreviated to "CBS"), N,N-dicyclohexyl-2 benzothiazole-sulphenamide ("DCBS"), N-tert'-butyl-2-benzothiazolesulphenamide ("TBBS"), N-tert-butyl-2 benzothiazolesulphenimide ("TBSI"), zinc dibenzyldithiocarbamate ("ZBEC"), Tetrabenzylthiuram disulfide ("TBZTD") and the mixtures thereof.

The final composition thus obtained is subsequently calendered, for example in the form of a sheet or of a plaque, in particular for laboratory characterization, or else extruded in the form of a rubber profiled element which can be used directly as snow tire tread or winter tire tread.

The vulcanization (or curing) is carried out in a known way at a temperature generally of between 110° C. and 190° C. for a sufficient time which can vary, for example, between 5 and 90 min depending in particular on the curing temperature, the vulcanization system adopted and the vulcanization kinetics of the composition under consideration.

The rubber compositions of the treads of the tires according to the invention can constitute all or a portion only of the tread in accordance with the invention, in the case of a tread of composite type formed from several rubber compositions of different formulations.

The invention relates to the rubber compositions and to the treads described above, both in the raw state (i.e., before curing) and in the cured state (i.e., after crosslinking or vulcanization).

The invention also applies to the cases where the rubber compositions described above form only one part of treads of composite or hybrid type, especially those consisting of two radially superposed layers of different formulations (referred to as "cap-base" construction), that are both patterned and intended to come into contact with the road when the tire is rolling, during the service life of the latter. The base part of the formulation described above could then constitute the radially outer layer of the tread intended to come into contact with the ground from the moment when a new tire starts rolling, or on the other hand its radially inner layer intended to come into contact with the ground at a later stage.

A twenty third aspect of the invention is the tire according to any one of the first to the twenty second aspects, wherein the tire is a snow tire.

The invention is further illustrated by the following non-limiting examples.

EXAMPLE

In the test, four rubber compositions (identified as C-1 (a reference), C-2, C-3 (examples according to the invention), and C-4 (a comparative example)) are compared. They are based on a diene elastomer (SBR bearing a SiOR function or Polyisoprene rubber (IR)) reinforced with a blend of silica (as a reinforcing inorganic filler) and carbon black, and a plasticizing agent comprising 40 phr of a tris(2-ethylhexyl) phosphate (as a liquid phosphate plasticizer) or of oleic sunflower oil (as another liquid plasticizer instead of the liquid phosphate plasticizer). The formulations of the four rubber compositions are given at Table 1 with the content of the various products expressed in phr.

C-1: based on SBR bearing a SiOR function, with the liquid plasticizer other than the liquid phosphate plasticizer (a reference);

C-2: based on SBR bearing a SiOR function, with the liquid phosphate plasticizer (an example according to the invention);

C-3: based on SBR bearing a SiOR function, with the liquid phosphate plasticizer (an example according to the invention);

C-4: based on IR, with the liquid phosphate plasticizer (a comparative example).

The reinforcing filler, its associated coupling agent, the plasticizing agent, the elastomer matrix and the various other ingredients, with the exception of the vulcanization system, were successively introduced into an internal mixer having an initial vessel temperature of approximately 60° C.; the mixer was thus approximately 70% full (% by volume). Thermomechanical working (non-productive phase) was then carried out in one stage, which lasts in total approximately 3 to 4 minutes, until a maximum "dropping" temperature of 165° C. was reached. The mixture thus obtained was recovered and cooled and then sulphur and an accelerator of sulphenamide type were incorporated on an external mixer (homofinisher) at 20 to 30° C., everything being mixed (productive phase) for an appropriate time (for example, between 5 and 12 min).

The rubber compositions thus obtained were subsequently calendered, either in the form of sheets (thickness of 2 to 3 mm) or of fine sheets of rubber, for the measurement of their physical or mechanical properties, or in the form of profiled elements which could be used directly, after cutting and/or assembling to the desired dimensions, for example as tire semi-finished products, in particular as tire treads.

The properties of the rubber compositions C-1 to C-4, obtained from friction coefficient measurements under arbitrary suitable conditions (snow, normal stress, sliding velocity and temperature) are given in Table 2, a value greater than that of the reference composition C-1, arbitrarily set at 100, indicating an improved result, i.e. an aptitude for a shorter braking distance.

After molding into the form of block(s) and before the friction coefficient measurements, each of the rubber compositions was placed in a press with heated platens at a temperature (typically 160° C.), and for the time that was necessary for the crosslinking of these rubber compositions (typically several tens of minutes), at a pressure (typically 16 bar).

The friction coefficient measurements were carried out based on the block(s) of the rubber compositions sliding at a given condition (a displacement: 0 to 0.03 m, a speed: 0 to 0.5 m/s, and an acceleration: 5 m/s$^2$) over a hard pack snow track, set at around −10° C. with a CTI penetrometer reading of about 90 in accordance with to Standard ASTM F1805, with an imposed stress (200 to 300 kPa). The forces generated in a direction of travel (Fx) of the block(s) and in another direction perpendicular to the travel (Fz) were measured. The Fx/Fz ratio determines the friction coefficient of the test specimen on the snow. This test, the principle of which is well known to a person skilled in the art (see, for example, an article entitled "Investigation of rubber friction on snow for tires" written by Sam Ella, Pierre-Yves Formagne, Vasileios Koutsos and Jane R. Blackford (38th LEEDS-Lyons Symposium on tribology, Lyons, 6-9 Sep. 2011)) makes it possible to evaluate, under representative conditions, the grip on snow which would be obtained after a running test on a vehicle fitted with tires whose tread is composed of the same rubber compositions.

The results from Table 2 demonstrate that the rubber composition C-2 according to the invention has certainly higher values of the grip performance on snow than that of the rubber composition C-1 (the reference) and the C-4 (the comparative example). Moreover, the rubber composition C-3 according to the invention exhibits the highest value in the rubber compositions.

In conclusion, the rubber composition of the tread of the tire according to the invention makes possible an improvement of grip on snowy ground of the tire.

TABLE 1

|  | C-1 | C-2 | C-3 | C-4 |
|---|---|---|---|---|
| SBR1 (1) | 100 | 100 |  |  |
| SBR2 (2) |  |  | 100 |  |
| IR (3) |  |  |  | 100 |
| Carbon black (4) | 5 | 5 | 5 | 5 |
| Silica (5) | 80 | 80 | 80 | 80 |
| Coupling agent (6) | 6.4 | 6.4 | 6.4 | 6.4 |
| Liquid plasticizer (7) | 40 |  |  |  |
| Liquid phosphate plasticizer (8) |  | 40 | 40 | 40 |
| Hydrocarbon resin (9) | 20 | 20 | 20 | 20 |
| ZnO | 1.3 | 1.3 | 1.3 | 1.3 |
| Stearic acid | 1 | 1 | 1 | 1 |
| Antiozone wax | 1.5 | 1.5 | 1.5 | 1.5 |
| Antioxidant (10) | 2.0 | 2.0 | 2.0 | 2.0 |
| DPG (11) | 1.9 | 1.9 | 1.9 | 1.9 |
| Sulphur | 2.0 | 2.0 | 2.0 | 2.0 |
| Accelerator (12) | 1.7 | 1.7 | 1.7 | 1.7 |

(1) SBR1: solution SBR with 16% of styrene unit and 24% of unit 1,2 of the butadiene part ($Tg_{DSC}$=−65° C.) bearing a SiOR function, R being a hydrogen atom, the SiOR being dimethylsilanol function at the end of the elastomer chain, the SBR prepared according to a process described in a patent EP 0 778 311 B1;
(2) SBR2: solution SBR with 16% of styrene unit and 24% of unit 1,2 of the butadiene part ($Tg_{DSC}$=−65° C.) bearing a SiOR function, R being a methyl radical, the SiOR function not located at the ends of the elastomer chain; wherein the silicon atom of the SiOR function is inserted between the carbon-carbon bonds of the elastomer chain; the SBR further bearing a tertiary amine function made of the amine substituted with two methyl radicals; wherein the nitrogen atom of the amine function is not inserted between the carbon-carbon of the elastomer chain, and the SiOR function bears the amine function; the SBR prepared according to a process described in a patent EP 2 285 852 B1;
(3) IR: Polyisoprene rubber ("IR2200" from ZEON ($Tg_{DSC}$=−62° C.));
(4) Carbon black: Carbon black (ASTM grade N234 from Cabot);
(5) Silica: Silica ("Zeosil 1165MP" from Rhodia (CTAB, BET: about 160 m$^2$/g));
(6) Coupling agent TESPT ("Si69" from Evonik);
(7) Oleic sunflower oil ("Agripure 80" from Cargill, Weight percent oleic acid: 100%);
(8) Tris(2-ethylhexyl)phosphate ("Disflamoll TOF" from Lanxess, $Tg_{DSC}$=−105° C.);
(9) Hydrocarbon resin $C_5/C_9$ type ("Escorez ECR-373" from Exxon, $Tg_{DSC}$=44° C.);
(10) N-(1,3-dimethylbutyl)-N-phenyl-para-phenylenediamine ("Santoflex 6-PPD" from Flexsys);
(11) Diphenylguanidine ("Perkacit DPG" from Flexsys);
(12) N-dicyclohexyl-2-benzothiazolesulphenamide ("Santocure CBS" from Flexsys).

TABLE 2

|  | C-1 | C-2 | C-3 | C-4 |
|---|---|---|---|---|
| Snow μ laboratory | 100 | 105 | 110 | 100 |

The invention claimed is:

1. A tire having a tread comprising a rubber composition based on at least:
   an elastomer matrix comprising more than 50 phr and up to 100 phr of a first diene elastomer bearing at least one SiOR function, R being a hydrogen atom or a hydrocarbon radical, and optionally, 0 to less than 50 phr of a second diene elastomer, which is different from the first diene elastomer;
   a reinforcing filler predominantly comprising a reinforcing inorganic filler, wherein the content of reinforcing inorganic filler is 20 to 80 phr; and
   a liquid phosphate plasticizer having a glass transition temperature of less than −80° C., wherein the content of the liquid phosphate plasticizer is 5 to 100 phr,
   wherein the first diene elastomer is a styrene-butadiene copolymer.

2. The tire according to claim 1, wherein the SiOR function is located at a chain end of the first diene elastomer.

3. The tire according to claim 1, wherein the SiOR function is not located at chain ends of the first diene elastomer.

4. The tire according to claim 1, wherein the first diene elastomer further bears at least one amine function.

5. The tire according to claim 4, wherein the SiOR function bears the amine function.

6. The tire according to claim 1, wherein R of the SiOR function is a hydrogen atom.

7. The tire according to claim 1, wherein R of the SiOR function is a hydrocarbon radical.

8. The tire according to claim 1, wherein the first diene elastomer has a glass transition temperature of lower than −40° C.

9. The tire according to claim 1, wherein the second diene elastomer is selected from the group consisting of polybutadienes, natural rubber, synthetic polyisoprenes, butadiene copolymers, isoprene copolymers and mixtures thereof.

10. The tire according to claim 1, wherein the reinforcing inorganic filler is silica.

11. The tire according to claim 1, wherein the reinforcing filler further comprises less than 40 phr of carbon black.

12. The tire according to claim 1, wherein the liquid phosphate plasticizer has between 12 and 30 carbon atoms in total.

13. The tire according to claim 1, wherein the liquid phosphate plasticizer is tris(2-ethylhexyl) phosphate.

14. The tire according to claim 1, wherein the rubber composition is further based on 0 to 50 phr of liquid plasticizer other than the liquid phosphate plasticizer.

15. The tire according to claim 14, wherein the liquid plasticizer other than the liquid phosphate plasticizer is selected from the group consisting of liquid diene polymers, polyolefinic oils, naphthenic oils, paraffinic oils, Distillate Aromatic Extracts (DAE) oils, Medium Extracted Solvates (MES) oils, Treated Distillate Aromatic Extracts (TDAE) oils, Residual Aromatic Extracts (RAE) oils, Treated Residual Aromatic Extracts (TRAE) oils, Safety Residual Aromatic Extracts (SRAE) oils, mineral oils, vegetable oils, ether plasticizers, ester plasticizers other than phosphate plasticizers, sulphonate plasticizers and mixtures thereof.

16. The tire according to claim 1, wherein the rubber composition is further based on 0 to 50 phr of hydrocarbon resin having a glass transition temperature above 20° C.

17. The tire according to claim 16, wherein the hydrocarbon resin is selected from the group consisting of cyclopentadiene homopolymer or copolymer resins, dicyclopentadiene homopolymer or copolymer resins, terpene homopolymer or copolymer resins, $C_5$ fraction homopolymer or copolymer resins, $C_9$ fraction homopolymer or copolymer resins, alpha-methyl styrene homopolymer or copolymer resins, and mixtures thereof.

18. The tire according to claim 1, wherein the tire is a snow tire.

* * * * *